US009531006B2

(12) United States Patent
Sun et al.

(10) Patent No.: US 9,531,006 B2
(45) Date of Patent: Dec. 27, 2016

(54) METHOD FOR MASS PRODUCTION OF SILICON NANOWIRES AND/OR NANOBELTS, AND LITHIUM BATTERIES AND ANODES USING THE SILICON NANOWIRES AND/OR NANOBELTS

(71) Applicant: Springpower International Incorporated, Mississauga (CA)

(72) Inventors: Xueliang Sun, London (CA); Yuhai Hu, London (CA); Xifei Li Li, London (CA); Ruying Li, London (CA); Quanmin Yang, Mississauga (CA)

(73) Assignee: SPRINGPOWER INTERNATIONAL INCORPORATED, Mississauga, Ontario (CA)

( * ) Notice: Subject to any disclaimer, the term of this patent is extended or adjusted under 35 U.S.C. 154(b) by 376 days.

(21) Appl. No.: 14/144,774

(22) Filed: Dec. 31, 2013

(65) Prior Publication Data

US 2015/0099173 A1    Apr. 9, 2015

(30) Foreign Application Priority Data

Oct. 7, 2013   (CA) .................................... 2829605

(51) Int. Cl.
*B81C 1/00*   (2006.01)
*H01M 4/38*   (2006.01)
(Continued)

(52) U.S. Cl.
CPC ............. *H01M 4/386* (2013.01); *C22C 38/02* (2013.01); *H01M 4/0404* (2013.01);
(Continued)

(58) Field of Classification Search
None
See application file for complete search history.

(56) References Cited

U.S. PATENT DOCUMENTS 5,348,618 A    9/1994  Canham et al.
5,627,382 A    5/1997  Canham et al.
(Continued)

FOREIGN PATENT DOCUMENTS

WO    WO2011124893    10/2011
WO    WO2012028857    * 3/2012  ............. C01B 33/02

OTHER PUBLICATIONS

H.K. Liu, Z.P. Guo, J.Z. Wang and K. Konstantinov, Si-based anode materials for lithium rechargeable batteries, Journal of Materials Chemistry, Aug. 12, 2010, pp. 1055-1057.
(Continued)

*Primary Examiner* — Yoshitoshi Takeuchi
(74) *Attorney, Agent, or Firm* — Geoffrey A. Mantooth; Brian K. Yost (57) ABSTRACT

This invention provides a method for mass production of silicon nanowires and/or nanobelts. The invented method is a chemical etching process employing an etchant that preferentially etches and removes other phases from a multi-phase silicon alloy, over a silicon phase, and allows harvesting of the residual silicon nanowires and/or nanobelts. The silicon alloy comprises, or is treated so as to comprise, one-dimensional and/or two-dimensional silicon nanostructures in the microstructure of the multi-phase silicon alloy prior to etching. When used as anode for secondary lithium batteries, the silicon nanowires or nanobelts produced by the invented method exhibit high storage capacity.

23 Claims, 5 Drawing Sheets

(51) Int. Cl.
H01M 4/04 (2006.01)
H01M 10/0525 (2010.01)
C22C 38/02 (2006.01)
H01M 4/134 (2010.01)
H01M 4/1395 (2010.01)
H01M 4/62 (2006.01)
H01M 4/66 (2006.01)

(52) U.S. Cl.
CPC ......... H01M 4/0435 (2013.01); H01M 4/134 (2013.01); H01M 4/1395 (2013.01); H01M 10/0525 (2013.01); H01M 4/625 (2013.01); H01M 4/661 (2013.01); Y02E 60/122 (2013.01); Y02P 70/54 (2015.11)

(56) References Cited

U.S. PATENT DOCUMENTS

| | | | |
|---|---|---|---|
| 7,569,202 | B2 | 8/2009 | Farrell et al. |
| 7,638,345 | B2 | 12/2009 | Lee et al. |
| 8,044,379 | B2 | 10/2011 | Wu |
| 8,143,143 | B2 | 3/2012 | Buchine et al. |
| 2004/0214085 | A1 | 10/2004 | Sheem et al. |
| 2005/0176264 | A1 | 8/2005 | Lai et al. |
| 2009/0186267 | A1 | 7/2009 | Tiegs |
| 2012/0070734 | A1* | 3/2012 | Uetani .......... H01M 4/13 429/211 |
| 2013/0216907 | A1* | 8/2013 | Rayner .......... B22F 9/04 429/211 |

OTHER PUBLICATIONS

Candace K. Chan, Hailin Peng, Gao Liu, Kevin McIlwrath, Xiao Feng Zhang, Robert A. Huggins and Yi Cui, High-performance lithium battery anodes using silicon nanowires, Nature Nanotechnology, vol. 3, Jan. 2008, Nature Publishing Group, pp. 31-35.
Hui Wu, Yi Cui, Designing nanostructured Si anodes for high energy lithium ion batteries, Nano Today 2012, pp. 1-16.
Uday Kasavajjula, Chunsheng Wang and A. John Appleby, Nano- and bulk silicon-based insertion anodes for lithium-ion secondary cells, Journal of Power Sources 163, 2007 pp. 1003-1039p.
Kuiqing Peng, Jiansheng Jie, Wenjun Zhang and Shuit-Tong Lee, Silicon nanowires for rechargeable lithium-ion battery anodes, Applied Physics Letters 93, 2008, 033105 4 pgs.
Hung Tran Nguyen, Mihai Robert Zamfir, Loc Dinh Duong, Young Hee Lee, Paolo Bondavalli and Didier Pribat, Alumina-coated silicon-based nanowire arrays for high quality Li-ion battery anodes. Journal of Materials Chemistry, 2012, 22, pp. 24618-24626.
A. Tarasov, W. Fu, O. Knopfmacher, J. Brunner, M. Calame and C. Schonenberger, Signal-to-noise ratio in dual-gated silicon nanoribbon field-effect sensors, Applied Physics Letters 98, 2011, 012114, 4 pgs.
Alfred J. Baca, Matthew A. Meitl, Heung Cho Ko, Shawn Mack, Hoon-Sik Kim, Jingyan Dong, Placid M. Ferreira and John A . Rogers, Printable Single Crystal Silicon Micro/Nanoscale Ribbons, Platelets and Bars Generated from Bulk Wafers, Advanced Functional Materials, 2007, 17, pp. 3051-3062.
S. Christiansen, R. Schneider, RI. Scholz, U. Gosele, TH. Stelzner, G. Andra, E Wendler and W. Wesch, Vapor-liquid solid growth of silicon nanowires by chemical vapor deposition on implanted templates, Journal of Applied Physics 100, 084323 2006, 6 pgs.
Justin D. Holmes, Keith P. Johnson, R. Christopher Doty and Brian A. Korgel, Control of Thickness and Orientation of Solution-Grown Silicon Nanowires, Science Magazine, vol. 287, Feb. 25, 2000, pp. 1471-1473.
Zhipeng Huang, Nadine Geyer, Peter Werner, Johannes de Boor and Ulrich Gosele, Metal-Assisted Chemical Etching of Silicon: A Review, Advanced Materials 23, 2011, pp. 285-308.
D.P. Wei and Q. Chen, Metal-Catalyzed CVD Method to Synthesize Silicon Nanobelts, Journal of Physics Chemistry, vol. 112, No. 29, 2008, pp. 15129-15133.
Tae-Eon Park, Ki-Young Lee, Ilsoo Kin, Joonyeon Chang, Peter Voorhees and Heon-Jin Choi, Combinatorial growth of Si nanoribbons, Nanoscale Research Letters, 2011, 6:476, 6 pgs.
Whensheng Shi, Hongying Peng, Ning Wang, Chi Pui Li, Lu Xu, Chun Sing Lee, Rafi Kalish and Shuit-Tong Lee, Free-standng Single Crystal Silicon Nanoribbons, Journal American Chemical Society, 2001, 123, pp. 11095-11096.
Niklas Elfstrom, Amelie Eriksson Karlstrom and Jan Linnros, Silicon Nanoribbons for Electrical Detection of Biomolecules, Nano Letters, vol. 8, No. 3, 2008, pp. 945-949.
Minghuang, Huang, Clark S. Ritz, Bozidar Novakovic, Decai Yu, Yu Zhang, Frank Flack, Donald E. Savage, Paul G. Evans, Irena Knezevic, Feng Liu and Max. G. Lagally, Mechano-electronic Superlattices in Silicon Nanoribbons, ACS Nano, vol. 3, No. 3, 2009, pp. 721-727.
K, Yamamoto, S. Ozawa, Y. Nakamura, S. Sugiyama, I. Jimbo and K. Kuribayashi, Phase Selection in Containerless Solidification of FeSi2 During Free Fall in Drop Tube, Microgravity Science Technology, XVi-1, 2005, pp. 138-142.
V, Raghavan, Al—Fe—Si (Aluminum-Iron-Silicon), Journal of Phase Equilibria and Diffusion, vol. 33, No. 4, 2012 pp. 322-326.
W.J. Yao, N. Wang and B. Wei, Containerless rapid solidification of highly undercooled Co—So eutectic alloys, Materials Science and Engineering A344, 2003, pp. 10-19.
International Application No. PCT/CA2014/000724, International Search Report and Written Opinion, Dec. 22, 2014, 10 pages.
Metal-assisted chemical etching of silicon and nanotechnology applications, Han et al. Nanotoday, vol. 9, Issue 3, Jun. 2014, pp. 271-304; available online on May 24, 2014.
One-dimensional Silicon Nanostructures for Li Ion Batteries, Taeseup et al., J. Phys. Chem. Letters, 2014, 5, 720-731. Published on Feb. 3, 2014, ACS Publications.
High-performance lithium battery anodes using silicon nanowires. Chan et al., Nature Nanotechology 3, 31-35 (2008). Published online: Dec. 16, 2007.

* cited by examiner

METHOD FOR MASS PRODUCTION OF SILICON NANOWIRES AND/OR NANOBELTS, AND LITHIUM BATTERIES AND ANODES USING THE SILICON NANOWIRES AND/OR NANOBELTS

FIELD OF INVENTION

This invention is related to mass production of silicon nanowires and nanobelts from low-cost multi-phase silicon alloys, and to the use or application of the silicon nanowires and/or nanobelts in anodes and/or for use in electrochemical energy storage devices such as secondary lithium batteries.

BACKGROUND OF THE INVENTION

Silicon is one of the most important modern materials that has found extensive applications in areas such as photonic, electronics, sensors, medical devices, energy storage devices, and the like. In the field of electrochemical energy storage, there has been a significant increase in recent years in development activities on the use of silicon as an anode material in lithium ion batteries due to the high theoretical storage capacity for lithium. Silicon has a theoretical specific capacity of 4200 mAh/g in its fully lithiated form (i.e. $Li_{22}Si_5$). This is more than 10 times of the theoretical capacity 372 mAh/g of graphite, which is the most popular commercial anode material today. However, silicon can experience up to 400 percent volumetric changes during lithiation and de-lithiation and this can introduce huge stress and strain in the material. When bulk or even micrometer scale silicon is used as an anode material in a lithium ion battery, the above stresses and strain cause physical disintegration of the active material particles, and the anode made from these materials, and can thus lead to rapid capacity fade. As such, major development efforts have been directed to the use of nanometer-size silicon materials that are small enough in dimension to release the stress and strain in the material, and thus retain its ability to act as an anode material in rechargeable lithium batteries [H. K. Liu et al., *J. Mater. Chem.*, 2010, 20, 10055-10057].

At the present time, the most promising nano-sized silicon anode material, in terms of electrochemical performance and commercial potential, is one-dimensional silicon nanowires [C. K. Chan, et al, *Nature Nanotech.*, 2008, 3, 31-35; H. K. Liu, et al, *J. Mater. Chem.*, 2010, 20, 10055-10057; H. Wu and Y. Cui, *Nano Today*, 2012, 7, 414-429; U. Kasavajjula and C. Wang, A. J. Appleby, *J. Power Sources*, 2007, 163, 1003-1039]. When used as the anode material in lithium batteries, silicon nanowires are able to release the stress and strain by changes in diameter and length without breaking down. This allows the silicon nanowires to retain their physical integrity and preserve the electrical conductivity required as an anode material. This provides significant advantages over other silicon nanostructures [H. Wu and Y. Cui, *Nano Today*, 2012, 7, 414-429; C. Chan et al, *Nature Nanotech.*, 2008, 3, 31-35; K. Q. Peng et al, *Appl. Phys. Letts.*, 2008, 93, 033105; H. T. Nguyen, et al, *J. Maters. Chem.*, 2012, 22, 24618-24626].

Other one-dimensional silicon nanostructures, such as nanobelts and nanoribbons, have also been made. In the present application, the term "one-dimensional nanostructure", or 1D nanostructure, refers to those nanostructures having at least one dimension being far greater than the other two dimensions and at least one dimension being less than 100 nm. Such 1D nanostructures typically have a length in one dimension, on a micrometer scale, and typically in the range of 1 to 1000 micrometers. Nanowires have a cross section of circular or oval shape and a diameter or equivalent diameter less than 100 nm. Nanobelts or nanoribbons have a cross section resembling a rectangular or rounded rectangular shape with a thickness less than 100 nm and a width typically in a range between 10 nm and 1000 nm. In this invention, nanobelts and nanoribbons are used as synonyms regardless of the width of their cross section.

Silicon nanobelts or nanoribbons have been reported for various applications [A. Tarasov, et al., *Appl. Phys. Lett.*, 2011, 98, Article Number: 012114; A. Baca, et al., *Adv. Fund. Mater.*, 2007, 17, 3051-3062]. They could also be used as anode material in lithium ion batteries with similar or even improved performance as of silicon nanowires.

However, in order to fully achieve the above advantages and materialize the full commercial potential of these anodes in the lithium ion battery industry, mass production of low cost one-dimensional silicon nanostructures, and in particular silicon nanowires or nanobelts, would be desirable.

So far, silicon nanowires can be grown by bottom-up (synthesis) and top-down (fabrication) approaches. The "bottom up" approach grows silicon nanowires using various deposition techniques performed usually under vacuum conditions, while the "top down" approach produces silicon nanowires by selectively removing part of the silicon from pure wafers or particles using various etching techniques performed either under vacuum conditions or in solution. In detail, these techniques include chemical vapor deposition, sputtering, plasma deposition, laser ablation, thermal evaporation decomposition, electron-beam evaporation, supercritical vapor-liquid-solid synthesis, reactive ion etching, lithography, electrochemical dissolution, plasma etching, and metal-assisted chemical etching, etc.

Among these techniques, vapor-liquid-solid (VLS) growth and metal-assisted chemical etching (MACE) are able to offer high-quality silicon nanowires, and are extensively employed in various development work [S. Christiansen, et al, *J. Appl. Phys.*, 2006, 100, 084323; J. D. Holmes, et al, *Science*, 2000, 287(5457), 1471-147, H. C. Chen, et al, US patent US20050176264; Z. P. Huang, et al, *Adv. Mater.*, 2011, 23(2) 285-308].

In 2009, Lee, et al., patented [U.S. Pat. No. 7,638,345] a method of/for manufacturing silicon nanowires by a solid-liquid-solid process or a vapor-liquid-solid process using a porous glass template having nanopores doped with erbium or erbium precursors. Other patents have been granted to fabricating methods of silicon nanowires using MACE process [Y. X. Wu, U.S. Pat. No. 8,044,379; L. T. Canham, et al., U.S. Pat. No. 5,348,618; A. Buchine, et al., U.S. Pat. No. 8,143,143; L. T. Canham, et al., U.S. Pat. No. 5,627,382].

Similarly to the synthesis of silicon nanowires, two kinds of approaches are used for producing silicon nanobelts or nanoribbons, i.e. top-down and bottom-up. The top-down approach uses lithography followed by chemical procedures to create the nanoribbon/nanobelt from silicon wafers, which is thus able to afford a good control of morphology and crystalline orientation [A. Tarasov, et al, Appl. Phys. Lett. 2011, 98, article#012114; A. Baca, et al, *Adv Funct Mater* 2007, 17, 3051-3062.]. The bottom-up approach is a chemical synthesis procedure decomposing silicon compounds precursors (mainly silane) to grow nanoribbons and/or nanobelts on a substrate, by an oxide-assisted growth (OAG) or vapor-liquid-solid (VLS) mechanism, followed by removing the substrate [D. Wei and a Chen, Q. *J. Phys. Chem.*, C 2008, 112, 15129-15133; T. Park, et al, *Nanoscale Res. Lett.*, 2011, 6, 476; W. Shi, et al, *J. Am. Chem. Soc.*, 2011, 123, 44, 11095-11096; N. Elfstroem and A. Karlstroem, J. Linnrost, Nano Lett., 2008, 8, 945-949; M. Huang, et al, Nano. Lett., 2009, 3, 721-727].

However, none of the above processes can be scaled up economically for mass production either because of processes complexity, including requirement of expensive production systems and process control, or because of the high raw materials cost. For example, the VLS process involves preparation of thin catalyst film (usually precious metals, e.g., gold or platinum) onto a silicon wafer substrate by sputtering deposition or thermal evaporation, liquidizing the catalysts at high temperature and injection of silane gas (highly reactive and toxic). In such a process, approximately 85% the injected silane gas leaves the reaction system unreacted, which results in a low yield and also requiring complex off gas handling. On the other hand, although MACE process proceeds in liquid phase without emitting toxic silane, it employs high-cost silicon wafer and noble metal salts (e.g., $AgNO_3$), which significantly increases the overall production cost. Furthermore, the silicon nanowires from these processes are usually not uniform in size because of the difficulty in controlling the size of the noble metal particles. Also, the etching does not go through the wafers, and most of the residual wafer silicon is left unutilized.

Some effort was made to produce three dimensional porous silicon powders with nanopores created by chemical etching or de-alloying process. For example, U.S. Pat. No. 7,569,202 B2 disclosed a process producing silicon nanosponge particles by etching metallurgical silicon particles. US patent publication No. 2004/0214085A1 disclosed another process to make similar silicon porous particles by de-alloying nickel from quenched (high rate cooling) silicon-nickel alloy particles. None of the above work was able to produce one-dimensional silicon nanostructures because there is no one-dimensional or two-dimensional silicon nanostructures existed in the microstructure of the metallurgical silicon or the quenched silicon-nickel alloy.

Economic, mass production of one-dimensional silicon nanostructures including silicon nanowires or nanobelts remains one of the biggest challenges in their commercial applications. Accordingly, a principal advantage of the present invention is the provision of a method which facilitates the economical production of silicon nanowires and/or nanobelts.

SUMMARY OF THE INVENTION

This invention provides a method for mass production of silicon nanowires and/or nanobelts and the like. In particular, the invented method is a chemical etching process employing an etchant or etching solution that preferentially etches and removes other phases and allows harvesting silicon nanowires and/or nanobelts from the microstructure of multi-phase silicon alloys.

Accordingly, in a first aspect, the present invention provides a method for production of silicon nanowires and/or nanobelts and the like, comprising providing a multi-phase silicon alloy having a silicon phase and at least one other phase; etching said multiphase silicon alloy using an etchant which selectively removes the non-silicon other phases; removing said etchant and the etched other phase material; and harvesting the remaining silicon nanowires and/or nanobelts. Preferably, the silicon phase in the multi-phase silicon phase is a one-dimensional or two-dimensional nanostructure, and which is preferably has a nanowire, nanobelt, nanorod, nanosheet, nanoplate, or nanolayer structure.

The multi-phase silicon alloy can be provided in any suitable form or shape. As such, the multi-phase silicon alloy is not limited to any form, but can be provided in the form of, for example, powders, granules, ribbons, wires, or crushed ingots, or any other form that can be formed by direct casting or after subsequent modification.

The remaining silicon nanostructures, after etching, are preferably provided or harvested as silicon nanobelts and nanowires. Other one-dimensional or two-dimensional nanostructures are not excluded however, and these can include nanorods, nanofibers, nanoflakes, nanoplates, nanosheets and the like.

Moreover, the harvested silicon nanowires and nanobelts are preferably not limited to nanostructures having a perfect cross-sectional shapes or sizes, but can be circular shaped, oval shaped, rectangular, or rounded rectangular shaped, or can have other irregular shapes and sizes. The collected nanowires and nanobelts preferably have an individual diameter or thickness of between 1 and 100 nanometers, and more preferably, have a thickness or diameter in the range of between 10 and 50 nanometers; the silicon nanobelts preferably have a belt width in the range of 10 and 1000 nanometers and the length of the silicon nanowires or nanobelts have a range between 0.5 and 1000 micrometers, and more preferably in the range of 1 and 10 micrometers.

The silicon nanowires and/or nanobelts can be single nanostructures, or can be made into any suitable agglomerated form. As such, the silicon nanowires and/or nanobelts are not limited to individual nanostructure or any particular agglomerated form, but can be used as single nanostructures, or used in agglomerated forms in wires, plates, spheres, rods, or the like.

A variety of different etchants can be used, including aqueous solutions of various acids, or other corrosive materials. The etchant is typically selected so as to remove the other material and/or phases, and leave essentially only the silicon nanostructure phase which was present in the microstructure of the silicon alloy. A most preferred etchant is hydrofluoric acid (HF) which is typically used as a solution, and typically, used as an aqueous solution.

One type of preferred multi-phase silicon alloy that can form silicon nanowires and/or nanobelts or similar morphology including nanorods, nanosheets, nanoplates and nanolayers in their microstructure include those that have at least one constituent phase that undergoes eutectoid reactions having silicon as one member phase of the co-precipitated, eutectoid reaction product.

Another type of preferred multi-phase silicon alloy includes those that have at least one constituent phase that undergoes eutectic reactions having silicon as one member phase of the co-crystallized reaction product.

Another type of preferred multi-phase silicon alloy includes those that have silicon as the primary phase in their solidification path.

Again, the remaining silicon nanostructures harvested are preferably nanowires and nanobelts, as previously defined. While various nanostructure shapes and sizes can be collected, most preferably, the silicon nanostructures are comprised substantially of nanowires and nanobelts. Further, mixtures of the various nanostructures are not excluded from the present invention. As such, the remaining silicon nanostructure can comprise a mixture of nanostructures. Preferably however, the mixture of harvested silicon nanostructures comprises over 50% nanowires and nanobelts and more preferably, greater than 70% nanobelts and nanowires, and yet most preferably, greater than 90% nanowires and nanobelts, by weight.

The harvested silicon nanowires and/or nanobelts, of the present invention are readily utilized in the production of anodes for use in batteries. As such, in a further aspect, the present invention also provides an anode comprising silicon nanowires and/or nanobelts, wherein said silicon nanowires and/or nanobelts have been produced by a method comprising providing a multi-phase silicon alloy having a silicon phase, and preferably a silicon nanostructure phase, and at least one other phase; etching said silicon alloy using an etchant which selectively removes said other phase; removing said etchant and the etched other phase material; and harvesting the remaining silicon nanowires and/or nanobelts.

The present invention is also particularly well suited for the production of lithium batteries, since when the silicon nanowires and nanobelts produced by the present method are used in the anode for a lithium battery, the battery will exhibit higher than normal storage capacity.

As such, in a still further aspect, the present invention also provides a lithium battery, and preferably a secondary lithium ion battery, a secondary solid lithium battery or a secondary lithium polymer battery, wherein said lithium battery comprises an anode which comprises a binder, a conductive additive, and a conductive substrate coated with the collected silicon nanowires and/or nanobelts. In particular, the lithium battery is preferably one wherein the binder is sodium alginate, the conductive additive is carbon black, carbon nanotubes, carbon graphene, or a mixture thereof, and said substrate is copper foil.

DETAILED DESCRIPTION OF PREFERRED EMBODIMENTS

In the present application, the term "electrochemical energy storage device" is used to refer to devices such as batteries, or the like. Moreover, the present application is primarily directed to the use of the production of silicon nanostructures, and most preferably the production of silicon nanowires and/or nanobelts which can be used in the production of anodes, and in particular, for use in the production of anodes for lithium based batteries. However, the skilled artisan will be aware that the silicon nanowires and/or nanobelts of the present invention can also be used in a wide variety of applications. Accordingly, while the present application is described with particular reference to the electrochemical energy storage device industry, the skilled artisan would be aware that the present application is equally applicable in other applications.

Various features of the present invention will now be described in additional detail.

Silicon Alloys

One feature of the present invention is the selection or preparation of multi-phase silicon alloys that have suitable microstructures in which there is a silicon nanostructure phase in the shape of nanowires, nanobelts, nanorods, nanosheets, nanoplates, nanolayers, or similar morphologies, prior to the etching step.

It is further clarified that while the product comprises substantially of 1D silicon nanostructures including silicon nanowires and silicon nanobelts, the silicon nanostructure in the said multiphase silicon alloys can be 1D nanostructures including nanowires, nanobelts, nanorods, and other similar morphologies. The silicon nanostructures in the said multi-phase silicon alloy can also be present as two-dimensional (2D) nanostructures including nanosheets, nanoplates, nanolayers, or similar morphologies. It is understood, though that in the practice of the present prevention, most of the 2D silicon nanostructures are expected to be converted to 1D silicon nanostructures by the etching process.

As such, the multi-phase silicon alloys can be any known silicon alloy that includes or can form the said silicon nanostructures. This can include materials wherein the silicon alloy microstructure is formed either in directly cast or solidified alloys, or as a result of various subsequent heat treatments.

In general, an alloy is a mixture, on an atomic level, of two or more elemental atoms. It can be comprised of one single phase, e.g. a solid solution of all constituent elements, or as a multiphase alloy with two or more constituent phases having different crystalline structures.

By thermal treatment or the like, some alloys can undergo microstructure change or phase change (e.g. from single phase to a multi-phase). The silicon alloy material is thus used as is when a multiphase silicon structure is present, or can be subjected to thermal or heat treatment prior to use, so as to provide a multiphase microstructure that contains the silicon nanostructures, which can be etched.

The following discloses three types of preferred multi-phase silicon alloys, namely Eutectoid silicon alloys, Eutectic silicon alloys, and Silicon alloys with Si as the primary crystallization phase, that can form the silicon nanostructures in their microstructure.

Eutectoid Silicon Alloys

One type of preferred multi-phase silicon alloys that can form 1D and 2D silicon nanostructures in their microstructure includes those that have at least one constituent phase that undergoes eutectoid reactions having silicon as one member phase of the co-precipitated, eutectoid reaction product. A eutectoid reaction is an invariant solid phase reaction in which one solid phase is simultaneously co-decomposed into two or more solid phases at a given temperature during cooling. The two or more co-precipitated product phases of the eutectoid reaction are usually in alternative plate or rod morphology forming lamellar or rod like microstructures. The size, e.g. the thickness of the plate or rod, is controlled by the inter-diffusion of elements in the mother solid phase in the front of the growing microstructure. Relatively slow elemental inter-diffusion in solid phase yields fine lamellar or rod like microstructures of eutectoid reactions.

Furthermore, if a eutectoid reaction is suppressed in cooling process due to the slowness of inter-diffusion in solid phase, a far finer microstructure can be formed when it is re-heated to a temperature below the eutectoid temperature in equilibrium phase diagram. If one phase in the co-precipitated eutectoid reaction is pure silicon phase and the plate thickness or rod diameter is in nanometer scale, it can be harvested by etching and removing the other member phases in the eutectoid reaction product.

The above microstructure and its formation were reported by K. Yamamoto, et al in [*Microgravity Sci. Tech.* XVI-I (2005), 138-142] in their work on $Fe_{33}Si_{67}$ alloy. In the cooling process, $\alpha$-$FeSi_2$ (HT) phase, wherein HT stands for High Temperature, was formed but the subsequent eutectoid decomposition reaction, denoted by $\alpha$-$FeSi_2$ (HT)→Si+$\beta$-$FeSi_2$ (LT) did not take place in the normal cooling process. At equilibrium or cooled slowly, this reaction should occur at 937° C. When it was re-heated to 807° C. and held for 1 hour, the metastable $\alpha$-$FeSi_2$ (HT) phase was decomposed to a lamellar microstructure with alternative layers of pure silicon and $\beta$-$FeSi_2$ (LT) phase, wherein LT stands for Low Temperature. The thickness of the pure silicon layer was in nanometer range, and as such, it can be called silicon nanoplates, nanosheets, or nanolayers.

In the practice of the present invention, if the $\beta$-$FeSi_2$ (LT) phase can be etched and removed preferentially, silicon nanowires and/or nanobelts can be formed from the plate like silicon phase in the microstructure. In contrast though, if the metastable, single phase $\alpha$-FeSi$_2$ (HT) phase with the same chemical composition is used, no silicon nanowires or nanobelts would be formed by etching since only the single phase material was present.

Similarly, if multi-phase silicon alloys are quenched to form amorphous silicon alloys or even multi-phase alloy, but without 1D and 2D silicon nanostructures in its microstructure, as disclosed in the USA patent application US20040214085A1 by K Y. Sheem, et al, then no silicon nanowires would be produced by subsequent etching.

Furthermore, silicon nanowires or nanobelts cannot be produced either by etching metallurgical grade silicon wherein there are no 1D or 2D silicon nanostructures in its microstructure, as disclosed by T. N. Tiegs in US patent application 20090186267A1 and D. Farrell et al., in U.S. Pat. No. 7,569,202 B2.

As such, one type of preferred multi-phase silicon alloys that can form 1D and 2D silicon nanostructures in their microstructure include those that have at least one constituent phase that undergoes a eutectoid reaction having silicon as one member phase of the eutectoid reaction product.

In binary multi-phase silicon alloys represented by Si-M (where M is Fe or Pd), only Si—Fe and Si—Pd alloys have a eutectoid reaction which provides silicon as one member phase of the eutectoid reaction product.

In Si—Fe alloys, the preferred composition range is 50% to 99% silicon in atomic percentage. Further preferred composition range is 60% to 90% silicon by atomic percentage. Yet further preferred composition range is 65% to 80% silicon by atomic percentage. The most preferred composition range is 67% to 73.5% silicon by atomic percentage.

In Si—Pd alloys, the preferred composition range is 33% to 99% silicon in atomic percentage. Further preferred composition range is 40% to 70% silicon by atomic percentage. Yet further preferred composition range is 45% to 55% silicon by atomic percentage. The most preferred composition range is about 50% silicon by atomic percentage.

It should be noted that while use of a Si—Pd alloy is not currently competitive in economic terms with Si—Fe, it does provide a high percentage of silicon nanowires in the eutectoid reaction product.

The invariant eutectoid reactions in Si-M alloys can be extended to invariant eutectoid reaction, monovariant eutectoid reaction and multivariant eutectoid reaction in ternary and multi-component alloys, designated as Si-M-M$_I$ alloys, with M representing Fe or Pd, and M$_I$ representing one or more elements other than Si and M (i.e. the other of Fe or Pd). In fact, M$_1$ is preferably the other of Fe or Pd, or is preferably Al, Cr or Mn.

As such, in the present invention, "eutectic reaction" refers to all above reactions including invariant eutectoid reaction, monovariant eutectoid reaction, and multivariant eutectoid reaction in binary, ternary, and multi alloys.

A typical example of this type of alloy is an Fe—Si—Al ternary system. It was reported that the eutectoid temperature in this ternary system is lowered to 750~720° C. from the 937° C. eutectoid temperature of the binary Si—Fe system [V. Raghavan, *J. Phase Equilibria Diffusion*, 2012, 33 (4) 322-326]. As the eutectoid temperature is lower in the ternary system and the reaction involves one more element to diffuse and one more phase to form, the size of the silicon phase in the eutectoid reaction will be smaller than in the binary system, favoring formation of finer 1D or 2D silicon nanostructures.

Those skilled in the art understand that M$_I$ is not limited to any element, or combination of elements. In general, preferred M$_I$ elements includes those that can help to adjust the size and percentage of silicon nanowires in the alloy; those that lower the alloy cost; and/or those that can benefit the subsequent etching process such as in yield, production cost, and impact on environment. Furthermore, alloys that are widely available in bulk quantities are preferred. As such, the most preferred ternary systems are those such as Si—Fe-M$_1$ alloys where M$_I$ is Cr, Mn, Al, or the like.

The preferred composition ranges in the above Si-M-M$_I$ multi-phase silicon alloys are those in which at least one constituent solid phase undergoes a eutectoid reaction having silicon as one member phase of the eutectoid reaction product. The most preferred compositions are those where the entire alloy undergoes a eutectoid reaction. This can be the invariant eutectoid composition, along the monovariant eutectoid line, or on multi variant eutectoid surface.

The composition range in which a eutectoid reaction takes place varies largely in different alloys. In general, the silicon content is preferred to be more than 10% and less than 95% by atomic percentage. If less than 10%, it is difficult to form a pure silicon phase, and if it is too close to 100%, it would be difficult to avoid the formation of large primary silicon particles.

Through this approach, a multi-phase silicon alloy can be formed having a solid silicon phase present as 1-D or 2-D silicon nanostructures such as silicon nanowires, nanorods, nanoplates, nanosheets, nanolayers, or the like.

Eutectic Silicon Alloys

Another type of preferred multi-phase silicon alloys that can form 1-D or 2-D silicon nanostructures in their microstructure include those that have at least one constituent phase that undergoes eutectic reactions having silicon as one member phase of the co-precipitated, eutectic reaction product.

A typical eutectic reaction involves a liquid or molten alloy phase to co-crystallize into two or more solid phases at a given temperature, and usually forming lamellar or rod like microstructures as well. In most cases the microstructure of eutectic reaction is coarser than that of eutectoid reaction due to fast diffusion in molten phase. However, if the alloy is super cooled and the eutectic reaction takes place at lower temperatures, fine and nanometer scale microstructures can be formed, as reported, for example, in a super cooled Si—Co alloy by Yao, et al. [*Mater. Sci, Eng.* A344 (2003), 10-19]. Furthermore, if a eutectic alloy is quenched from a molten phase to form an amorphous solid alloy, or a glass phase, and then re-heated to a temperature below the eutectic temperature, a solid to solid reaction takes place. This solid to solid pseudo eutectic reaction is virtually a eutectoid reaction as described in last section. This expands greatly the range of multi-phase silicon alloys that can form 1D or 2D silicon nanostructures in their microstructure.

Such silicon alloys can be represented by Si-M$_{II}$ in binary and multi-component silicon alloys, where M$_{II}$ is one or more elements selected from Ag, Al, Au, Au, B, Ba, Ca, Ce, Co, Cr, Cu, Fe, La, Li, Mg, Mn, P, Pd, Pt, Rh, Ru, Sr, Ta, Ti, U, V, W, Zr, and Y. Preferably, M$_{II}$ are those elements forming low cost alloys with silicon including, Al, Mg, Fe, Co, Cu, and Cr.

The preferred composition ranges in the above multi-phase silicon alloys are those in which at least one constituent liquid phase or quenched solid phase undergoes a eutectic reaction, including invariant eutectic reaction, monovariant eutectic reaction, and multi-variant eutectic reaction having silicon as one member phase of the eutectic reaction product. The most preferred compositions are those where the entire alloy undergoes a eutectic reaction. This can be the invariant eutectic composition, along the monovariant eutectic line, or on multi variant eutectic surface.

The composition range in which a eutectic reaction takes place varies largely in different alloys. However, preferably the level of Si in the alloy is between 10 and 95%, by atomic percentage.

The Etching Solution and Etching Process

A feature of the present invention is the selection of an etchant or etching solution that will preferentially or selectively etch and remove other elements and/or other phases over the silicon phase so that the existing silicon phase in the microstructure of the alloy, remains for harvesting. The etching process can be applied to the multi-phase silicon alloys in a batch or continuous operation. It will be understood that the etchant can etch some of the silicon phase. However, the etchant is preferably selected so that it will selectively etch the other phases at a higher rate, or at a rate so that the other phase can be effectively removed without significant impact on the silicon phase. As such, the etching process will leave the silicon phase essentially intact, for collection of the silicon nanostructures, including nanowires and nanobelts, from the silicon microstructure.

The etching process can be used to produce silicon nanostructures as a separate product. Alternatively, the etching process can be used to produce silicon nanostructures into or in combination with another material in situ to form a composite, or the etching process can be conducted so as to produce silicon nanostructures in situ onto a substrate to make a device such as an anode for batteries.

The etchant or etching solution can be any aqueous, organic solutions, or combinations thereof that can preferentially etch other phases over silicon phase. Those skilled in the art may use other etching media as long as it preferentially etches these other phases over silicon phase. A preferred etchant is hydrofluoric acid, although other acids or corrosive materials might be used.

For multi-phase ferrosilicon alloys that have silicon nanostructures and the like in their microstructure, hydrofluoric acid (HF acid) solution in water, organic solvent or a mixture thereof is preferred for removing the other phases. Preferred HF acid solutions contain 1%~90% HF acid by weight; yet further preferred HF acid solution contain 5% to 80% HF acid by weight; yet further preferred HF acid solution contain 5% to 50% HF acid by weight; yet further preferred HF acid solution contain 5% to 30% HF acid by weight; and yet further preferred HF acid solution contain 5% to 20% HF acid by weight. In the most preferred embodiment, the etchant comprises 5% to 15% HF acid by weight, in water, organic solvent, or a mixture thereof.

Other strong solution of $HNO_3$, HCl, $H_2SO_4$, $AgNO_3$, $CuCl_2$, $HNO_3$—$AgNO_3$, $HNO_3$—$CuCl_2$, HF—$CuCl_2$, and $HNO_3$—HCl can be used, but typically produce results inferior to the HF acid. On their own, these other materials typically were found to be either insufficiently selective, or generally unable to selectively remove the other phases over silicon, in a multi-phase ferrosilicon alloy. However, their use in other alloy systems might provide acceptable properties.

The above HF containing solution can however, also be used in combination with other constituents, including acids, or the like. For example, nitric acid, hydrochloric acid, hydrogen peroxide, metal salts, etc. can be added to the HF solution. The addition of other constituents can modify the morphology and change the yield of the silicon nanostructures. The preferred content of other constituent in the etching solution however is preferably less than the concentration of the HF acid, and the most preferred range for these other constituents, when present, is less than 15%, and most preferably is less than 5%.

The etching temperature also has an impact on the etching process and the product silicon nanostructures. For example, the etching process can typically be completed in approximately three hours at room temperature. Elevated temperatures, (i.e. above room temperature of 20° C.) accelerate the etching process but can reduce the nanostructure yield. Lower temperatures slow down the process significantly but can produce more uniform silicon nanostructures. As such, the preferred etching temperature range is between about 0° C. and about 100° C.; further preferred range is about 0° C. to about 50° C.; and the most preferred range is from about 0° C. to about 20° C.

The etching duration also has an impact on the purity and yield of the silicon nanostructures. Too short of a reaction time typically results in the presence of other residual phases (other than silicon) in the nanostructure, and too long a time period reduces the yield of the silicon nanostructure.

The purity of the silicon nanostructure can be determined by the content of elements other than silicon. The preferred etching duration leads to pure silicon nanostructures of over 80% silicon, and more preferably greater than 90% silicon. Most preferably, the nanostructures produced contain greater than 99% silicon.

The preferred etching duration therefore depends on etching temperature and the alloy. At room temperature and for multi-phase ferrosilicon alloys the preferred etching duration is 0.1 to 10 h; further preferred range is 0.5 to 6 h and the most preferable range is 0.5 to 3 h. At 0° C. and also for multi-phase ferrosilicon alloys the preferred etching duration is 1 to 48 h, and most preferable range is 12 to 24 h.

The optimal etching duration may also be shortened or affected by providing agitation to the solution.

Process Scale Up and Raw Material Availability

Another feature of the invented method is the ease of scale up for mass production. Etching is a widely applied industrial process such as in chemical industry and metallurgical industry, and thus, the process of the present invention is well suited for process scale up.

Further, commercial sources for multi-phase ferrosilicon alloys covering the entire composition range for eutectoid reaction and eutectic reaction are well known and used in the steel and ferrous metal industries as a source of reductant. As such, these materials are readily available in bulk quantities at low cost.

Further Coating of the Silicon Nanowires with Conductive Materials

The silicon nanostructures such as nanowires and nanobelts produced by the invented method can also be coated with carbon or other conductive materials to enhance its electrical conductivity. Such coating processes can be performed by known chemical processes, physical processes, and by combinations thereof and therebetween. Commonly used methods for coating include chemical vapor deposition processes (CVD) and conductive polymer coating processes. Accordingly, in this invention, the use of the phrase silicon nanostructures including nanowires and nanobelts in relation to anodes and batteries can refer to both pure silicon nanostructures as well as silicon nanostructures coated with a conductive coating.

Anode, Lithium Batteries and the Processes to Manufacture them

The invention herein provides an anode as hereinabove defined. The anode of use in the battery of the present invention also preferably comprises a conductive substrate, generally a metallic copper foil, which has been coated with silicon nanowires and/or silicon nanobelts of the present invention, a binder, for example polyvinylidene fluoride (PVDF) and sodium alginate, with a conductive additive including, for example, carbon black, carbon nanotubes, and carbon graphenes and the like, or a mixture thereof.

Additionally, in a further aspect, the invention provides a process for making an anode as hereinabove defined preferably comprising (i) preparing a coating slurry by mixing silicon nanowires and/or nanobelts, prepared by the inventive process described hereinabove, with a binder which is preferably polyvinylidene fluoride or sodium alginate, a conductive additive which is preferably selected from carbon black, carbon nanotubes, and carbon graphenes and the like, or a mixture thereof and a solvent (preferably such as N-methylpyrrolidinone for the PVDF, or water for the sodium alginate); (ii) applying said coating slurry to a current collector such as a copper foil; and (iii) drying and calendering said coating slurry onto the current collector.

Those skilled in the art may find other processes to make the anode comprising the silicon nanowires and/or nanobelts. For example, one might produce silicon nanowires and/or nanobelts in situ on to a solid substrate or into a porous substrate to form an anode directly. Alternatively, one might "load" the starting multi-phase silicon alloy into a composite or onto a substrate and then etch the multi-phase silicon alloy.

By these methods, the resultant silicon nanowires and/or nanobelts of the present invention can be used to make an anode for use in lithium batteries, and in particular, secondary lithium batteries, according to the invention.

Furthermore, the present invention also provides lithium batteries (and typically secondary lithium batteries), which have a high storage capacity, particularly when the anode active material comprises silicon nanowires and/or nanobelts prepared by the inventive process described herein. As a result, the batteries of the present invention have high capacities and enhanced cycling stability.

As such, the present invention provides a lithium battery, and preferably a secondary lithium battery, having an anode comprising silicon nanowires and/or nanobelts which are produced in accordance with the present invention. The battery as hereinabove defined is preferably selected from a secondary lithium ion battery, secondary solid lithium battery and secondary lithium polymer battery.

For example, to make one embodiment of a secondary lithium battery, the anode of use in the invention as hereinabove defined and a cathode, separated by a separator, are used to form an electrode assembly. The said electrode assembly is rolled into a cylindrical form and then inserted into a cylindrical battery housing. Electrolyte is then filled into the separator and the pores of the electrodes and the battery housing are sealed to form the final cylindrical battery. The above electrode assembly could also be rolled into a prismatic form and inserted into a prismatic housing to form a prismatic secondary lithium battery.

The above electrode assembly can also be formed into circular shape and form a button cell.

The cathode can be made of any commercial cathode materials such as layered oxides, e.g., $LiCoO_2$, $LiNi_{1/3}Mn_{1/3}CO_{1/3}O_2$, $Li(NiCoAl)O_2$, etc., a ployanion, e.g., $LiFePO_4$, and spinels, e.g. $LiMn_2O_4$, or sulfur or air cathodes and the like. The electrolyte can be $LiPF_6$ salt dissolved in organic carbonate or any other commercial electrolyte including ionic electrolyte. Typical non-aqueous liquid electrolyte is a mixture of organic carbonates such as ethylene carbonate and diethyl carbonate with lithium salts such as $LiPF_6$, $LiClO_4$, $LiBF_4$, and the like.

The anode can also be used in secondary lithium polymer batteries or solid secondary lithium batteries wherein the electrolyte can be lithium ion conducting polymer materials or lithium ion conducting solid inorganic materials, respectively.

BRIEF DESCRIPTION OF THE DRAWINGS

In order that the invention can be better understood, preferred embodiments will now be described by way of example only, with reference to the accompanying drawings, wherein.

The figures will be used in the discussion of the following examples.

EXAMPLES

The novel features which are believed to be characteristic of the present invention, as to its structure, organization, use and method of operation, together with further objectives and advantages thereof, will be better understood from the following examples, and drawings, in which presently preferred embodiment of the invention will now be illustrated by way of example only.

It is expressly understood, however, that the examples and drawings are for the purpose of illustration and description only and are not intended as a definition of the limits of the invention. Also, unless otherwise specifically noted, all of the features described herein may be combined with any of the above aspects, in any combination.

Silicon Alloy Example 1

A commercial ferrosilicon alloy powder denoted as $\beta$-$FeSi_2$ was purchased from market, and having a Si level of between 67 to 73.5%, by atomic percentage.

Figure 1:
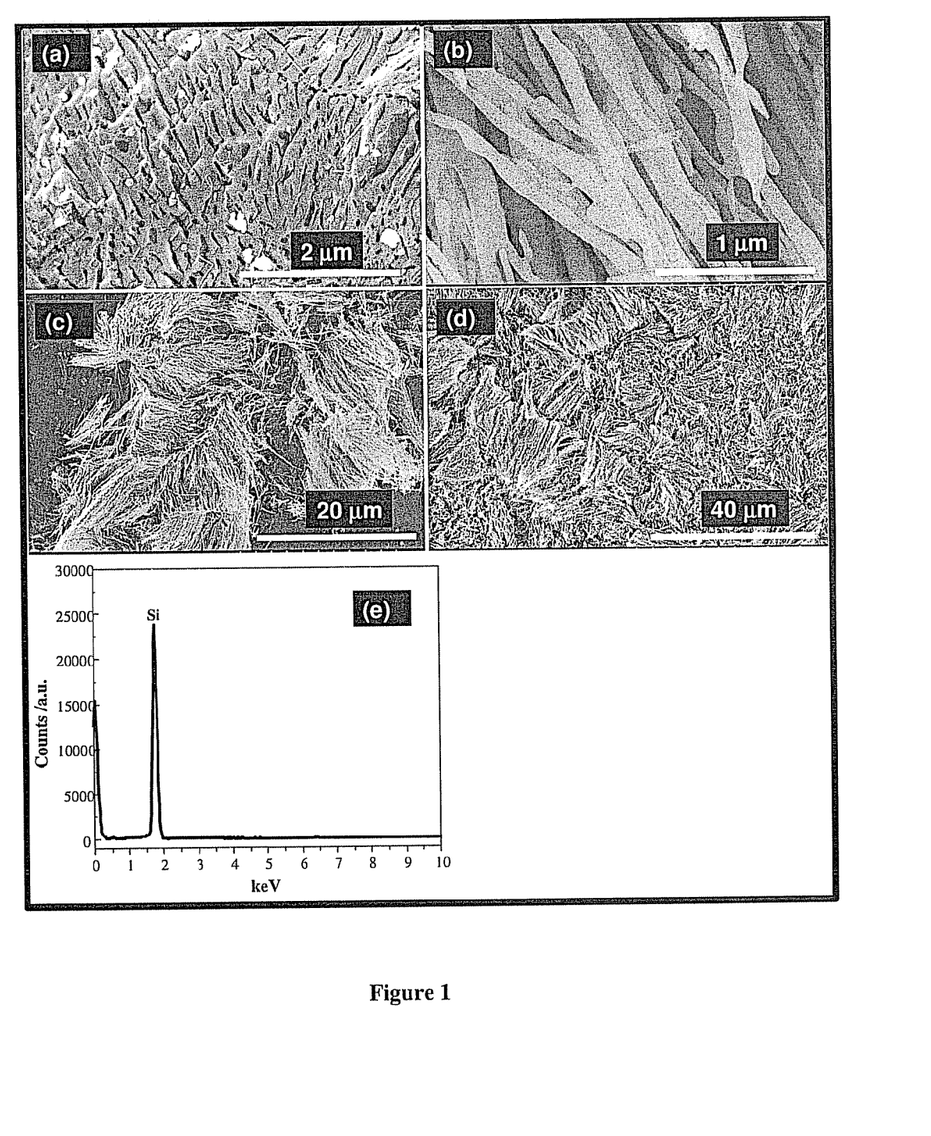
FIG. 1 is a series of scanning electron microscope (SEM) images of:
  (a) Commercial $\beta$-$FeSi_2$ alloy before etching;
  (b) to (d) silicon nanowires and nanobelts produced from the alloy by etching for 40 min; and
  (e) EDX analysis of silicon nanowires and nanobelts.

FIG. 1(a) shows the scanning electronic microscope (SEM) image of the as received material, revealing a microstructure with alternating silicon nanolayers and $\beta$-$FeSi_2$ phase layers. It can be observed that the silicon nanostructures indeed exist in the alloy microstructure prior to etching.

The powdered alloy material having the microstructure shown in FIG. 1 (a) was then etched in an aqueous HF solution at 11.5% HF by weight, for 40 min at room temperature. SEM images of thus produced silicon nanowires and nanobelts are shown in FIGS. 1(b) to 1(d) at different magnifications. The images show that the silicon nanowires and nanobelts are in bundles with individual silicon nanowires and nanobelts being 20 to 100 nanometers in diameter or thickness and approximately 10 microns in length.

Energy-dispersive X-ray spectroscopy (EDX) analysis of the produced silicon nanowires is shown in FIG. 1(e), indicating essentially pure silicon in composition.

Silicon Alloy Comparative Example 1

Figure 2:
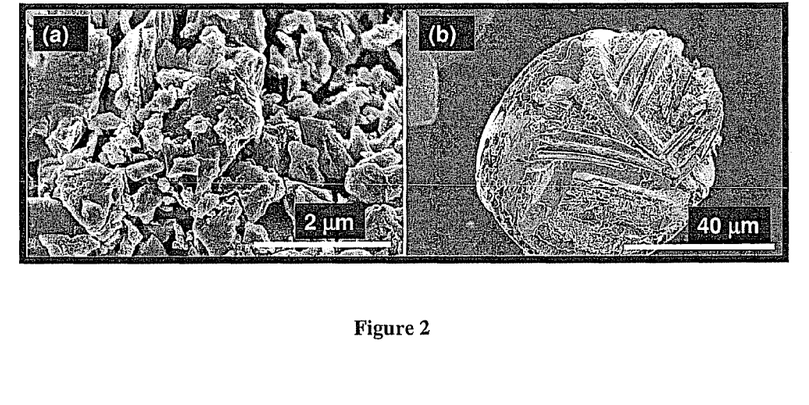
FIG. 2 is a series of scanning electron microscope (SEM) images of commercial $\alpha$-$FeSi_2$ before and after etching.

A ferrosilicon alloy of the same chemical composition as of Silicon Alloy Example 1 but with a single metastable α-FeSi$_2$ phase was obtained from market. This material was etched in the same etching solution as Silicon Alloy Example 1. The SEM image in FIG. 2 (a) indicates a single phase without any silicon nanostructures in its microstructure. The SEM image of the etched product in FIG. 2(b) shows that no silicon nanowires or nanobelts were produced, compared to FIG. 1(d) of Silicon Alloy Example 1 at the same magnification.

This demonstrates that 1D and/or 2D silicon nanostructures must be present in the alloy microstructure prior to etching, in order to isolate and collect the remaining silicon nanowires and/or nanobelts after etching.

Silicon Alloy Example 2

The same α-FeSi$_2$ single phase alloy as in Comparative Silicon Alloy Example 1 was used as one of the two as received materials in this example. The other alloy is a low purity commercial ferrosilicon alloy with the same nominal composition Fe$_{33}$Si$_{67}$ in atomic ratio. It should be noted that this latter alloy material is produced in large quantity for metallurgical industry and can be supplied at low cost.

However, no silicon nanostructures can be produced by etching of the as received above alloys, as was demonstrated in Silicon Alloys Comparative Example 1, for example, since no silicon nanostructures exist in the as received alloys.

Heat treatment was applied to both alloys in order to produce a suitable multiphase silicon alloy with acceptable silicon nanostructures in their microstructures. The same etching process as in Silicon Alloy Example 1 was then used to produce silicon nanostructures. The results of these experiments, for the alloys as received, and as pre-treated at different temperatures, for different times, prior to cooling to room temperature, are shown in Table 1:

TABLE 1

Heat treatment of FeSi$_2$ alloys followed by chemical etching

| Ferrosilicon source | Heat treatment | Results of etching |
|---|---|---|
| α-FeSi$_2$ | As received | No Si nanostructures were produced |
| | 800° C. 20 h | Produced uniform silicon nanowires and nanobelts |

TABLE 1-continued

Heat treatment of FeSi$_2$ alloys followed by chemical etching

| Ferrosilicon source | Heat treatment | Results of etching |
|---|---|---|
| | 850° C. 20 h | Produced uniform silicon nanowires and nanobelts, but at lower yield than at 800° C. |
| Low Purity FeSi$_2$ | As received | No Si nanostructures were produced |
| | 800° C. 2.5 h | Produced uniform silicon nanowires and nanobelts |
| | 800° C. 7.5 h | Produced uniform silicon nanowires and nanobelts |
| | 800° C. 20 h | Produced uniform silicon nanowires and nanobelts, with greater length (>10 μm) and higher yield than for short durations 2.5 h and 7.5 h. |

Silicon Alloy Comparative Example 2

Figure 3:
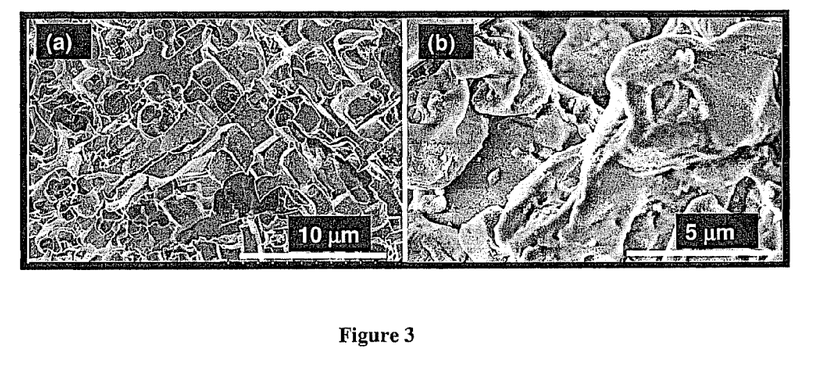
FIG. 3 is a series of scanning electron microscope (SEM) images of etched product of a $Fe_{55}Si_{45}$ alloy and a $Fe_{14}Si_{86}$ alloy.

Commercial Fe$_{55}$Si$_{45}$ and Fe$_{14}$Si$_{86}$ alloys (both in atomic fractions), were acquired for etching. Fe$_{55}$Si$_{45}$ was etched at the same conditions as in Silicon Alloy Example 1 and Fe$_{14}$Si$_{86}$ was etched in an HF water and ethanol solution (3 mL HF acid of 45 wt % HF added to 10 mL ethanol). The morphologies of the etched products are shown in FIG. 3. The etched Fe$_{55}$Si$_{45}$ gives rise to a porous structure with the wall thickness varying but usually over 1 μm as seen in FIG. 3(a). EDX analysis shows the Fe/Si ratio is ~1, indicating a phase of ε-FeSi. No pure Si phase was produced, as expected from an alloy composition that has no pure silicon phase in its microstructure. No silicon nanowires or nanobelts are observed in the etched Fe$_{14}$Si$_{86}$ product, as shown in FIG. 3(b). This alloy has a predominantly primary silicon phase in its microstructure, but has little or no silicon nanostructures.

Silicon Alloys Comparative Example 3

Other silicon alloys WSi$_2$, CrSi$_2$, and TiSi$_2$, all in atomic ratio, were purchased from market and etched as in Silicon Alloy Example 1 but all produced no silicon nanostructures since these materials are all single phase intermetallic compound alloys, and no silicon phase exists in their microstructure.

As such, it can be noted that silicon nanowires and/or nanobelts can only be produced by the said etching process from multi-phase silicon alloys that have silicon phase in the form of 1-D and/or 2-D silicon nanostructures in their microstructure prior to etching.

Etching Example 1

In the present invention, etching is a critical step in the production of silicon nanowires and/or nanobelts in order to remove the other phases in an alloy that has 1-D and/or 2-D silicon nanostructures in their microstructure. The etching solution, or etchant, for these examples, is the same solution used in Silicon Alloy Example 1, and is an aqueous HF solution with 11.5% HF by mass.

The etching was performed at room temperature for 40 min without agitation, and produced silicon nanowires and nanobelts of acceptable purity and yield.

Etching Example 2

Etching of the same commercial β-FeSi$_2$ as in Silicon Alloy Example 1 was conducted for 3 hours at various temperatures. The results are summarized in Table 2. It will be noted that the reaction proceeded faster at higher temperatures, but the yield of silicon nanowires and nanobelts is reduced. Conversely, the reaction slowed down significantly when temperature drops, but more uniform silicon nanowires and nanobelts were produced.

TABLE 2

Effect of temperature on etching process and product

| Temperature | Relative Reaction Rate | Production |
|---|---|---|
| 0° C. | Slower | More uniform silicon nanowires and nanobelts with higher yield |
| 20° C. | Fast | Uniform silicon nanowires and nanobelts |
| 50° C. | Very fast | Less uniform silicon nanowires and nanobelts with lower yield |

Etching Example 3

In order to investigate the effect of etching solution on the morphology and the yield of silicon nanowires and nanobelts, a given amount of $HNO_3$, HCl, $H_2SO_4$ and $H_2O_2$ was added to the HF solution as in Etching Example 1. Table 3 tabulates the etching solutions tested, and their impact on the reaction product. Obviously, the presence of a second acid in the HF etching solution can affect the resultant product, and the effect of $HNO_3$ and $H_2O_2$ are typically more significant than that of HCl and $H_2SO_4$. Overall, however, the production of silicon nanowires and nanobelts was greatly suppressed in the presence of $HNO_3$ and $H_2O_2$, and in fact, no silicon nanowires or nanobelts were produced at all when 1.5 mL of $HNO_3$ or $H_2O_2$ acid was added under these conditions.

This demonstrates that the etchant must be one that selectively removes the other material, over the removal of silicon, in order to produce the proper silicon nanostructures.

TABLE 3

A summary of a second acid added to 13 mL of HF etching solution as in Etching Example 1 and their effect on the reaction products

| Acid | Added Volume/mL | Impact |
|---|---|---|
| $HNO_3$ | 0.5 | Lower yield |
| | 1.5 | No silicon nanowires or nanobelts |
| | 3.0 | No silicon nanowires or nanobelts |
| HCl | 0.5 | No impact |
| | 1.5 | No impact |
| | 3.0 | Lower yield |
| $H_2SO_4$ | 0.5 | No impact |
| | 1.5 | Lower yield |
| | 3.0 | Lower yield |
| $H_2O_2$ | 0.5 | Lower yield |
| | 1.5 | No silicon nanowires or nanobelts |
| | 3.0 | No silicon nanowires or nanobelts |

Etching Example 4

Figure 4:
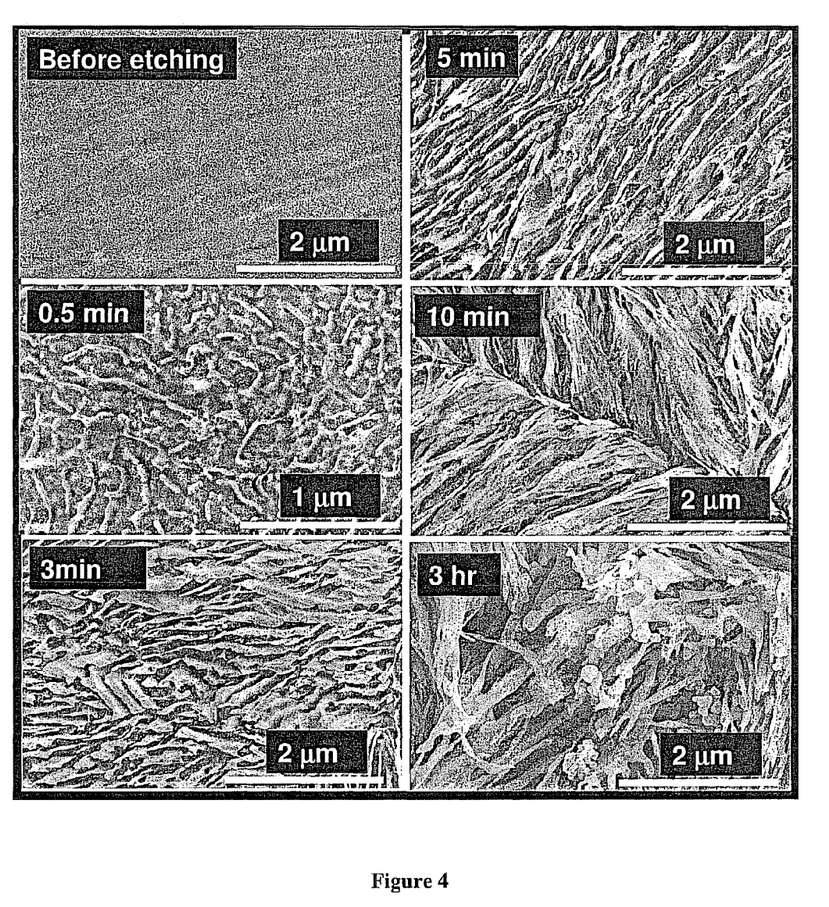
FIG. 4 is a series of scanning electron microscope (SEM) images of $\beta$-$FeSi_2$ alloy after etching for varied durations.

To investigate the impact of etching duration on the production of silicon nanowires and nanobelts, the same ferrosilicon alloy and standard etching solution as in Silicon Alloy Example 1 were used but at varied etching duration. The results on morphology changes are demonstrated in FIG. 4 and the Fe/Si ratio in Table 4. It is seen that after etching the iron level was reduced. After 40 min, all of the iron containing phases have been removed and pure silicon nanowires and nanobelts were obtained.

TABLE 4

Fe/Si ratio changes with etching duration

| Etching duration | Fe/Si ratio by atomic fraction |
|---|---|
| 5 min | 0.33 |
| 10 min | 0.26 |
| 30 min | 0.25 |
| 40 min | 0 |
| 45 min | 0 |

Etching Comparative Example 1

According to the above analysis, etching is a key step to remove other phase and harvest silicon nanostructures such as nanowires and nanobelts. To understand whether silicon nanowires and/or nanobelts can be formed by chemically de-alloying of iron using strong acid, the following strong acids, transition metal salts and their mixture with a certain ratio were used: $HNO_3$, HCl, $H_2SO_4$, $AgNO_3$, $CuCl_2$, $HNO_3$—$AgNO_3$, $HNO_3$—$CuCl_2$, HF—$CuCl_2$, and $HNO_3$—HCl. The results demonstrated that the tested acids and salts above or their combination are either ineffective and/or chemically inert with respect to selectively removing the other phases in the ferrosilicon alloy and produce silicon nanowires. More details of the results are shown in Table 5.

TABLE 5

Results of etching ferrosilicon alloys with other strong acids or mixture

| Acid or mixture | Results |
|---|---|
| $HNO_3$ | No evident reaction, with no nanowire (NW) or Nanobelts (NB) formation |
| HCl | No evident reaction, with no NW or NB formation |
| $H_2SO_4$ | No evident reaction, with no NW or NB formation |
| $AgNO_3$ | No evident reaction, with no NW or NB formation |
| $CuCl_2$ | No evident reaction, with no NW or NB formation |
| $HNO_3$—$AgNO_3$ | No evident reaction, with no NW or NB formation |
| $HNO_3$—$CuCl_2$ | No evident reaction, with no NW or NB formation |
| $HNO_3$—HCl | No evident reaction, with no NW or NB formation |
| HF | Reactions proceed fast, with uniform NW or NB formation |
| HF—$AgNO_3$ | Reactions proceed fast, with uniform but less NW and NB formation |
| HF—$CuCl_2$ | Reactions proceed fast, with uniform but less NW and NB formation |

Electrochemical Performance Example 1

For electrochemical characterization, silicon nanowires and nanobelts produced in this invention were first coated with conductive carbon by a CVD process with ethylene as the carbon sources. Thermal gravity analysis showed that the carbon coating was established at 13 wt %. The working electrodes were prepared by slurry casting onto a Cu foil as a current collector. The slurry contained the silicon nanowires and nanobelts (63.75 wt % on dry solid basis), sodium alginate binder (15 wt % on dry solid basis) and conductive carbon (21.25%). The electrodes were dried in a vacuum oven at room temperature for several days. The electrodes were assembled in a CR 2032-type coin cell configuration. A lithium foil was used as a counter electrode. Electrolyte was composed of 1 M $LiPF_6$ salt dissolved in a solution consisting ethylene carbonate, diethyl carbonate, ethyl methyl carbonate (1:1:1 in volume). Charge-discharge characteristics were tested galvanostatically in a voltage range of 0.01-1.5 V (vs. Li$^+$/Li) at a desired current density using an Arbin BT-2000 Battery Test System.

Figure 5:
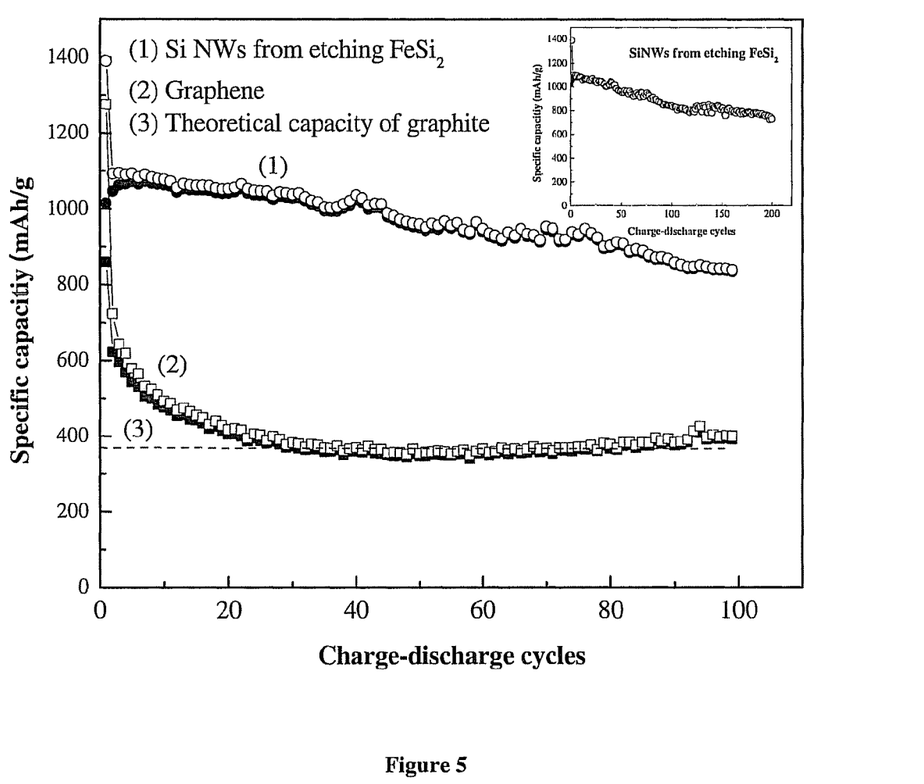
FIG. 5 is a chart of charge and discharge cycling performance of a silicon nanowires and nanobelts anode of the present invention.

FIG. 5 shows the charge-discharge cyclic performances of the silicon nanowires and nanobelts (denoted as Si NWs in the figure) tested at 420 mA/g. The silicon nanowires and nanobelts anode shows an initial reversible capacity of ~1100 mAh/g on the basis of carbon coated silicon, which declines at a slow rate with cycling. After 200 cycles, the capacity remains ~800 mAh/g, with a capacity retention of ~73%.

As comparison, the theoretical capacity for commercial graphite and the cycling performance of graphene are also included in FIG. 5.

Schematic Anode and Secondary Lithium Battery Example 1

Figure 6:
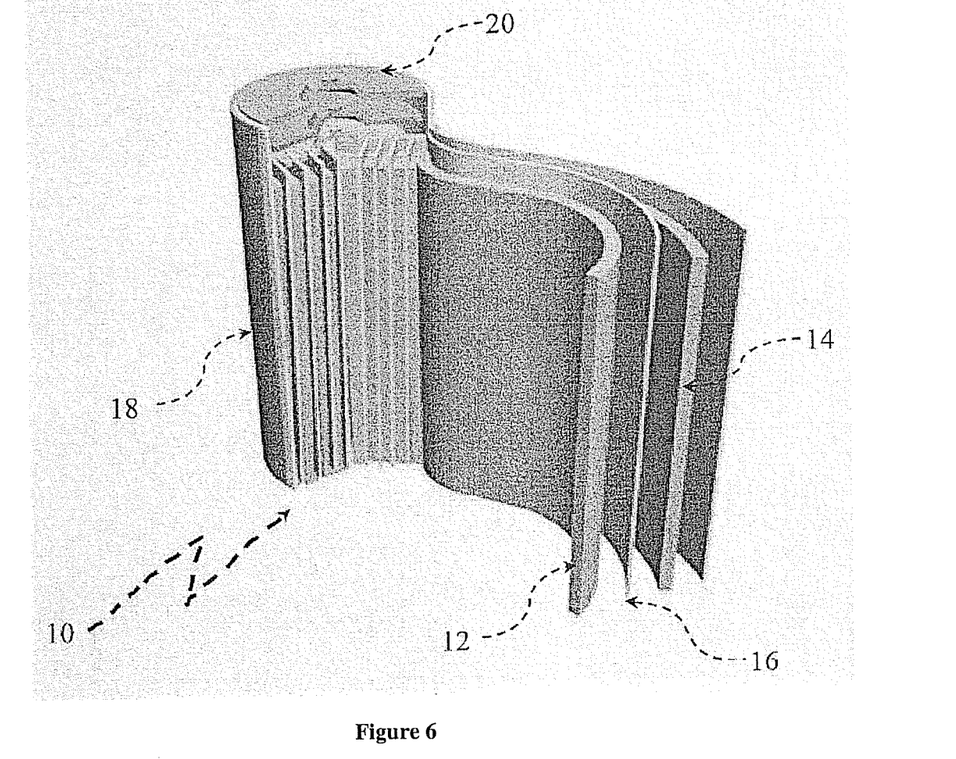
FIG. 6 is an exploded perspective view of a secondary lithium battery according to the invention.
Figure 7:
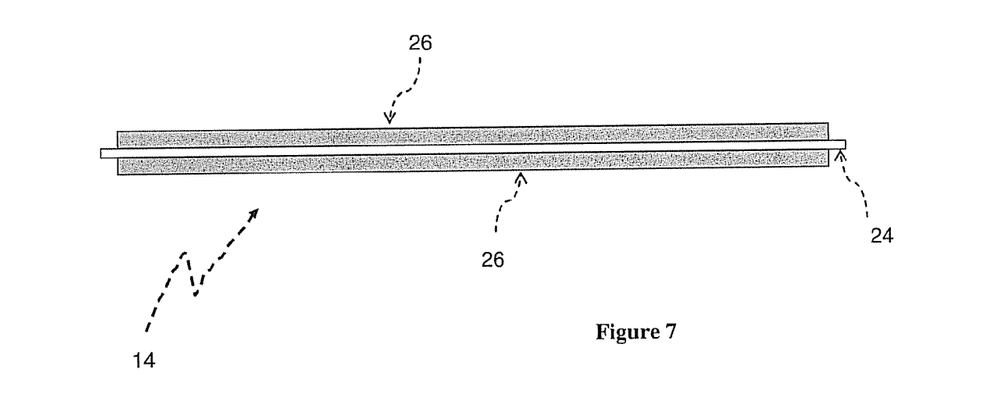
FIG. 7 is a diagrammatic horizontal cross-section of an anode of use in the battery of FIG. 6.

FIG. 6 shows generally as 10 a secondary lithium battery having a plurality of cathodes 12 separated from anodes 14 by separators 16 formed of a porous material comprising a non-aqueous electrolyte, within housing 18 and having a top cap 20. As seen in FIG. 7, anode 14 has a central copper current collector 24 which is coated on both sides with active material coating 26 comprising silicon nanowires and/or nanobelts, conductivity additive and a binder material.

Alternatively, secondary lithium batteries may be prepared wherein separator 16 is a lithium ion conducting polymer, as in a secondary lithium polymer battery, or a solid, lithium ion conducting inorganic or organic material, as in a solid secondary lithium battery.

As such, the silicon nanowires and/or nanobelts of the present invention can easily be used to prepare batteries using conventional construction designs and techniques.

Thus, it is apparent that there has been provided, in accordance with the present invention, a method for the production of silicon nanowires and/or nanobelts, and their use as anodes in lithium batteries, which fully satisfies the goals, objects, and advantages set forth hereinbefore. Therefore, having described specific embodiments of the present invention, it will be understood that alternatives, modifications and variations thereof may be suggested to those skilled in the art, and that it is intended that the present specification embrace all such alternatives, modifications and variations as fall within the scope of the appended claims.

Additionally, for clarity and unless otherwise stated, the word "comprise" and variations of the word such as "comprising" and "comprises", when used in the description and claims of the present specification, is not intended to exclude other additives, components, integers or steps. Further, the invention illustratively disclosed herein suitably may be practiced in the absence of any element which is not specifically disclosed herein.

Moreover, words such as "substantially" or "essentially", when used with an adjective or adverb is intended to enhance the scope of the particular characteristic; e.g., substantially planar is intended to mean planar, nearly planar and/or exhibiting characteristics associated with a planar element.

Further, use of the terms "he", "him", or "his", is not intended to be specifically directed to persons of the masculine gender, and could easily be read as "she", "her", or "hers", respectively.

Also, while this discussion has addressed prior art known to the inventor, it is not an admission that all art discussed is citable against the present application.

The invention claimed is:

1. A method for production of silicon nanowires and/or nanobelts comprising providing a multi-phase silicon alloy having a silicon nanostructure phase and at least one other phase; etching said multi-phase silicon alloy using an etchant which selectively removes said other phase so as to form silicon nanowires and/or nanobelts, wherein said etchant is a chemical etchant which etches said at least one other phase preferentially over silicon phase, wherein said etchant is an aqueous and/or organic solution of hydrofluoric acid and having a hydrofluoric acid content of between 5 and 80% by weight; removing said etchant and the etched other phase material; and harvesting the remaining silicon nanowires and/or nanobelts.

2. A method as claimed in claim 1 wherein said multi-phase silicon alloy contains one-dimensional and/or two-dimensional silicon nanostructures in their microstructure.

3. A method as claimed in claim 2 wherein said one-dimensional and/or two-dimensional silicon alloy nanostructures comprise nanowires, nanorods, nanoplates, nanosheets, and nanolayers of silicon.

4. A method as claimed in claim 1 wherein said hydrofluoric acid content is between 5 and 20%.

5. A method as claimed in claim 1 wherein said hydrofluoric acid content is between 5 and 15%.

6. A method as claimed in claim 1 wherein said etchant additionally comprises additional acids or salts, and wherein the amount of said acids or salts is less than 15%, by weight, of said etchant.

7. A method as claimed in claim 6 wherein the amount of said acids or salts in said etchant is less than 5%, by weight, of said etchant.

8. A method as claimed in claim 2 wherein said one-dimensional and/or two-dimensional silicon nanostructures in said multi-phase silicon alloy are formed in direct casting and/or by subsequent heat treatment of a silicon alloy.

9. A method as claimed in claim 1 wherein said multi-phase silicon alloy is prepared from a silicon alloy that comprises at least one constituent phase that undergoes a eutectoid reaction having silicon as one member phase of the eutectoid reaction product.

10. A method as claimed in claim 9 wherein said silicon alloy is a Si—Fe alloy.

11. A method as claimed in claim 10 wherein said Si—Fe alloy comprises between 50 to 99% silicon by atomic percentage.

12. A method as claimed in claim 10 wherein said Si—Fe alloy comprise between 60 and 90% silicon by atomic percentage.

13. A method as claimed in claim 10 wherein said Si—Fe alloy comprises between 67 to 73.5% silicon by atomic percentage.

14. A method as claimed in claim 9 wherein said silicon alloy is a Si—Pd alloy.

15. A method as claimed in claim 14 wherein said Si—Pd alloy comprises between 33 to 99% silicon by atomic percentage.

16. A method as claimed in claim 14 wherein said Si—Pd alloy comprises between 45 to 55% silicon by atomic percentage.

17. A method as claimed in claim 1 wherein said multi-phase silicon alloy has a formula of Si-M-M.sub.I wherein M is Fe or Pd and M.sub.I represents the other of Fe or Pd, or any other element other than Fe or Pd, and wherein at least one constituent solid phase of said alloy undergoes a eutectoid reaction having silicon as one member phase of the eutectoid reaction product.

18. A method as claimed in claim 17 wherein said multi-phase silicon alloy has a formula of Si-M-M.sub.I wherein M is Fe or Pd and M.sub.I represents the other of Fe or Pd, or Al, Cr or Mn, and wherein at least one constituent solid phase of said alloy undergoes a eutectoid reaction having silicon as one member phase of the eutectoid reaction product.

19. A method as claimed in claim 1 wherein said multi phase silicon alloy comprises at least one constituent liquid phase or quenched solid phase and which undergoes a eutectic reaction having silicon as one member phase of the eutectic reaction product.

20. A method as claimed in claim 19 wherein said multi-phase silicon alloy is a binary or multi component silicon alloy represented by Si-M.sub.II, wherein M.sub.II is one or more elements selected from Ag, Al, Au, Au, B, Ba, Ca, Ce, Co, Cr, Cu, Fe, La, Li, Mg, Mn, P, Pd, Pt, Rh, Ru, Sr, Ta, Ti, U, V, W, Zr, and Y and wherein at least one constituent liquid phase or quenched solid phase undergoes a eutectic reaction having silicon as one member phase of the eutectic reaction product.

21. A method as claimed in claim 20 wherein M.sub.II is one or more elements selected from Al, Mg, Fe, Co, Cu, Cr, and Mn.

22. A method as claimed in claim 1 wherein said silicon nanowires and/or nanobelts are subsequently coated with a conductive material.

23. A method as claimed in claim 22 wherein said conductive material is carbon.

* * * * *